(12) United States Patent
Nourai et al.

(10) Patent No.: US 12,322,029 B2
(45) Date of Patent: *Jun. 3, 2025

(54) USING A HIERARCHICAL ORGANIZATION OF A TEXTURE ATLAS TO RENDER VISIBLE IMAGE PORTIONS

(71) Applicant: Meta Platforms Technologies, LLC, Menlo Park, CA (US)

(72) Inventors: Reza Nourai, Danville, CA (US); Volga Aksoy, Redwood City, CA (US); Zeyar Htet, San Mateo, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,749

(22) Filed: Apr. 4, 2023

(65) Prior Publication Data

US 2023/0245375 A1 Aug. 3, 2023

Related U.S. Application Data

(63) Continuation of application No. 17/217,261, filed on Mar. 30, 2021, now Pat. No. 11,676,324.

(51) Int. Cl.
*G06T 15/04* (2011.01)
*G06T 1/60* (2006.01)
(Continued)

(52) U.S. Cl.
CPC .............. *G06T 15/04* (2013.01); *G06T 1/60* (2013.01); *G06T 9/00* (2013.01); *G06T 15/20* (2013.01); *H04L 67/10* (2013.01)

(58) Field of Classification Search
None
See application file for complete search history.

(56) References Cited

U.S. PATENT DOCUMENTS

| | | |
|---|---|---|
| 10,755,474 B1 | 8/2020 | Schneider |
| 11,094,075 B1 | 8/2021 | Lanman et al. |

(Continued)

OTHER PUBLICATIONS

Texture Atlas Generator Submitted by 3d-io on Thu, Jan. 29, 2009 02:31 https://www.scriptspot.com/3ds-max/scripts/texture-atlas-generator (Year: 2009).*

(Continued)

*Primary Examiner* — Jason A Pringle-Parker
(74) *Attorney, Agent, or Firm* — Greenberg Traurig, LLP

(57) ABSTRACT

In one embodiment, a method includes a step of receiving a geometric representation of a virtual object and a texture atlas, the geometric representation comprising multiple geometric primitives defining a shape of the virtual object, the texture atlas comprises regions each of which is allocated to include shading information of a respective geometric primitive of the plurality of geometric primitives, and the shading information of the respective geometric primitive being scaled down to be smaller than the allocated region so as to create a buffer between the allocated region and adjacent regions of the plurality of regions on the texture atlas. The method further includes steps of identifying, based on a first viewpoint from which to view the virtual object, visible geometric primitives from the plurality of geometric primitives and rendering images of the visible geometric primitives using corresponding shading information included in the texture atlas.

11 Claims, 8 Drawing Sheets

(51) Int. Cl.
*G06T 9/00* (2006.01)
*G06T 15/20* (2011.01)
*H04L 67/10* (2022.01)

(56) References Cited

U.S. PATENT DOCUMENTS

| | | | |
|---|---|---|---|
| 2002/0158873 A1 | 10/2002 | Williamson | |
| 2004/0151390 A1 | 8/2004 | Iwamura | |
| 2005/0030317 A1* | 2/2005 | Spicer | G06T 11/001 345/582 |
| 2008/0001962 A1 | 1/2008 | Lefebvre et al. | |
| 2008/0094411 A1* | 4/2008 | Parenteau | G09G 5/393 345/592 |
| 2008/0238919 A1* | 10/2008 | Pack | G06T 15/04 345/582 |
| 2009/0208110 A1 | 8/2009 | Hoppe et al. | |
| 2013/0286025 A1* | 10/2013 | Spells, III | G06T 13/20 345/473 |
| 2014/0267248 A1 | 9/2014 | Zou et al. | |
| 2015/0235392 A1* | 8/2015 | Sakurai | G06T 11/001 345/582 |
| 2015/0269785 A1 | 9/2015 | Bell et al. | |
| 2015/0339268 A1* | 11/2015 | Bednarz, Jr. | G06F 40/14 715/248 |
| 2015/0371410 A1* | 12/2015 | Hwang | G06T 11/001 345/582 |
| 2016/0267056 A1* | 9/2016 | Hertzog | G06F 9/451 |
| 2017/0227765 A1 | 8/2017 | Mammou et al. | |
| 2017/0278293 A1* | 9/2017 | Hsu | G06T 11/001 |
| 2017/0365069 A1* | 12/2017 | Dupont | G06T 17/205 |
| 2019/0066370 A1 | 2/2019 | Schmalstieg et al. | |
| 2019/0098278 A1 | 3/2019 | Koizumi | |
| 2019/0347845 A1 | 11/2019 | Makar et al. | |
| 2020/0020150 A1 | 1/2020 | Johansson et al. | |
| 2020/0175759 A1 | 6/2020 | Russell et al. | |
| 2020/0226816 A1 | 7/2020 | Kar et al. | |
| 2020/0364926 A1 | 11/2020 | Mueller et al. | |
| 2021/0264166 A1 | 8/2021 | Slutsky et al. | |
| 2021/0295572 A1* | 9/2021 | Bialogonski | G06F 3/0485 |
| 2021/0390761 A1 | 12/2021 | Kowalski et al. | |
| 2021/0392313 A1 | 12/2021 | Kimura | |

OTHER PUBLICATIONS

Texture Atlas Generator http://lukasz.dk/2011/04/18/texture-atlas-generator/ (Year: 2011).*

Broxton M., et al., "Immersive Light Field Video with a Layered Mesh Representation," ACM Transactions on Graphics, Article 86, Jul. 2020, vol. 39 (4), 15 pages.
Carr., et al., "Meshed Atlases for Real-Time Procedural Solid Texturing," ACM Transactions on Graphics, Apr. 2002, vol. 21 (2), 26 pages.
Ernst, "Open Sourcing Seurat: bringing high-fidelity scenes to mobile VR," Google Developers, May 4, 2018, 4 pages.
Goldlucke B., et al., "Real-Time Microfacet Billboarding for Free-Viewpoint Video Rendering," Proceedings 2003 International Conference on Image Processing (Cat. No.03CH37429), IEEE, Sep. 14, 2003, vol. 3, pp. 713-716.
International Search Report and Written Opinion for International Application No. PCT/US2021/055785 mailed Apr. 28, 2022, 9 pages.
International Search Report and Written Opinion for International Application No. PCT/US2022/012691, mailed Jun. 7, 2022, 10 pages.
International Search Report and Written Opinion for International Application No. PCT/US2022/022217 mailed Jul. 15, 2022, 11 pages.
Kamburelis M., "Shadow Maps and Projective Texturing in X3D," 15th International Conference on Web 3D Technology, Jul. 24, 2010, pp. 17-26.
Mayer A.J., "Virtual Texturing," Retrieved from Internet: https://www.cg.tuwien.ac.at/research/publications/2010/Mayer-2010-VT/Mayer-2010-VT-Thesis.pdf, Oct. 14, 2010, 113 pages.
Mildenhall B., et al., "Local Light Field Fusion: Practical View Synthesis with Prescriptive Sampling Guidelines," ACM Transactions on Graphics (TOG), Jul. 12, 2019, vol. 38 (4), pp. 1-14.
Mildenhall B., et al., "NeRF: Representing Scenes as Neural Radiance Fields for View Synthesis," European Conference on Computer Vision (ECCV), Aug. 3, 2020,25 pages.
Mittring M., et al., "Advanced Virtual Texture Topics," SIGGRAPH '08: ACM SIGGRAPH 2008 Games, Aug. 11, 2008, pp. 23-51.
Mueller., et al., "Shading Atlas Streaming," ACM Transactions on Graphics, Article 199, Nov. 2018, vol. 37 (6), 16 pages.
Wang Q., et al., "IBRNet: Learning Multi-View Image-Based Rendering," Arxiv.Org, Cornell University Library, Feb. 25, 2021, pp. 4690-4699.
Yu A., et al., "pixelNeRF: Neural Radiance Fields from One or Few Images," arXiv, 2020, 20 pages, https://arxiv.org/abs/2012.02190.
Zhou T., et al., "Stereo Magnification: Learning View Synthesis using Multiplane Images," ACM Transactions Graph, Aug. 2018, vol. 37 (4), Article 65, pp. 65:1-65:12.

* cited by examiner

USING A HIERARCHICAL ORGANIZATION OF A TEXTURE ATLAS TO RENDER VISIBLE IMAGE PORTIONS

PRIORITY

This application is a continuation under 35 U.S.C. § 120 of U.S. patent application Ser. No. 17/217,261, filed Mar. 30, 2021. The application noted above is incorporated herein.

TECHNICAL FIELD

This disclosure generally relates to rendering Augmented-Reality (AR) or Virtual-Reality (VR) content on user devices. This disclosure generally relates to storing and rendering AR/VR content on a cloud architecture.

BACKGROUND

Virtual reality is a computer-generated simulation of an environment (e.g., a 3D environment) that users can interact with in a seemingly real or physical way. A virtual reality system, which may be a single device or a group of devices, may generate this simulation for display to a user, for example, on a virtual reality headset or some other display device. The simulation may include images, sounds, haptic feedback, and/or other sensations to imitate a real or imaginary environment. As virtual reality becomes more and more prominent, its range of useful applications is rapidly broadening. The most common applications of virtual reality involve games or other interactive content, but other applications such as the viewing of visual media items (e.g., photos, videos) for entertainment or training purposes are close behind. The feasibility of using virtual reality to simulate real-life conversations and other user interactions is also being explored.

Augmented reality provides a view of the real or physical world with added computer-generated sensory inputs (e.g., visual, audible). In other words, computer-generated virtual effects may augment or supplement the real-world view. For example, a camera on a virtual reality headset may capture a real-world scene (as an image or video) and display a composite of the captured scene with computer-generated virtual objects. The virtual objects may be, for example, two-dimensional and/or three-dimensional objects, and may be stationary or animated.

SUMMARY OF PARTICULAR EMBODIMENTS

Figure 1:
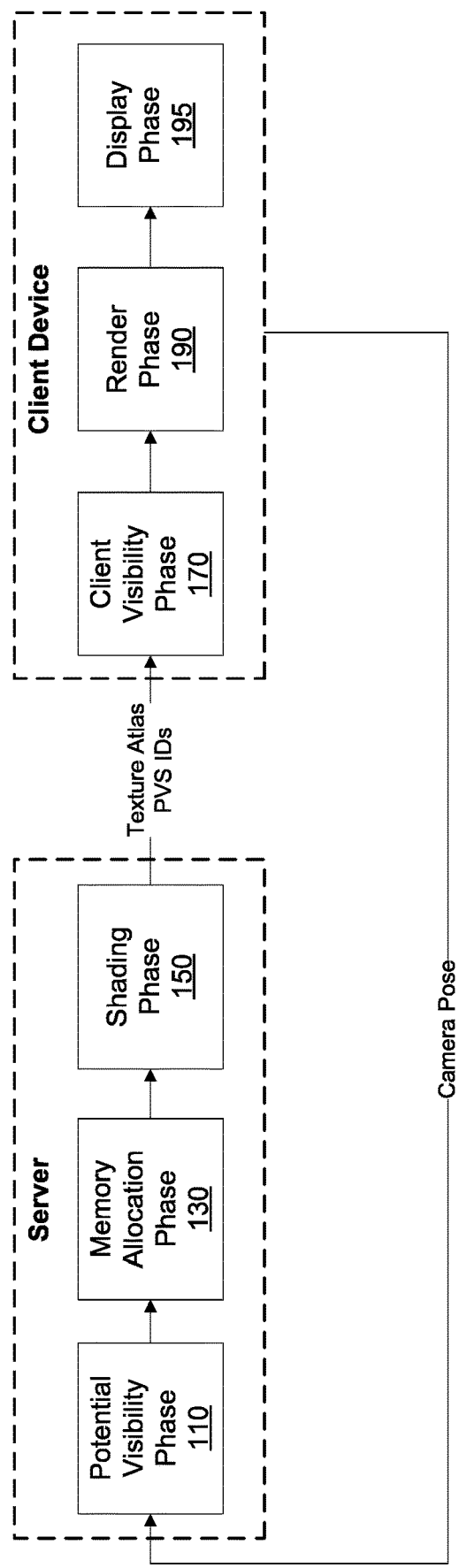
FIG. 1 illustrates an example system architecture of a server and a client device.

Embodiment of this disclosure is directed to addressing problems associated with providing high-quality AR/VR content to light-weight, low-cost devices, such as mobile phones. The invention aims to provide a latency-resilient AR/VR experience by utilizing cloud rendering for the bulk of intensive computing while leveraging local reconstruction on a user device so the latency for the final rendering is largely decoupled from network conditions. Traditional cloud-rendering approaches use a server to perform all rendering tasks and send only the final video stream to the client device. But due to latency caused by the rendering process and network transmission, by the time the video is displayed to the user, the viewpoint used by the server to render the video would likely be different from the viewpoint of the user. The difference in the viewpoints would manifest as lag, and the lag would become especially pronounced when the geometry of the virtual object is complex and the network condition is poor. To address these issues, the embodiments of this disclosure uses a server to perform the heavy-duty rendering tasks and encodes artifacts of 3D objects. Those artifacts are then sent to and used by the user device to reconstruct an image of the object using the most up-to-date viewpoint of the user.

Certain embodiments are directed to real-time cloud-based rendering. Instead of asking the cloud to render the final output frames, the cloud is tasked with rendering a stream of texture atlases for a list of potentially visible portions of objects, which could be transmitted to client devices and used to render the final, pose-adjusted output frames based on the user's most up-to-date viewpoints. This framework allows expensive rendering operations (e.g., shading) to be offloaded to the cloud while addressing rendering latency caused by the time needed for transmission and rendering.

In an embodiment, the cloud is tasked with estimating a portion of a virtual object that would be visible to a user from a given viewpoint, plus some variance to account for changes in the viewpoint. In other words, multiple viewpoints are used to estimate what is visible. The cloud then performs expensive shading operations for those portions to generate a high-quality texture atlas. The texture atlas contains all the shading information of the visible surfaces corresponding to the rendered scenes. The potentially visible geometry (e.g., primitives, such as triangles) and the texture atlas can then be sent to a client device, which in turn can use the geometry and texture atlas to render images based on the user's latest viewpoint. The client device could use the same atlas to render several frames. What this means is that the cloud doesn't need to render and transmit frames at display rate (e.g., 60 fps), but could instead take its time and send atlases at a much slower rate (e.g., 20 fps).

In certain embodiments, the server-side operations are performed in three phases: potential visibility phase, memory allocation phase, and shading phase. The potential visibility phase involves the server receiving the current camera pose (e.g., current view matrix) from the client device and using the camera pose to determine geometry primitives of virtual objects (e.g., triangles) that are visible from the camera viewpoint. The memory allocation phase involves determining a layout of a texture atlas comprising all of the visible geometry primitives. In some embodiments, the visible geometry primitives placed on the atlas may be scaled down in size to create a layer of buffer between the visible geometry primitives included in the atlas. The shading phase involves rendering the texture of all of the visible geometry primitives on the atlas. The shaded texture atlas is compressed and provided to the client device.

In certain embodiments, the client-side operations are performed in three phases: client visibility phase, render phase, and display phase. The client visibility phase involves determining the current camera pose (e.g., viewpoint), then identifying the geometry primitives that are visible from the current camera pose. The render phase involves rendering the texture of the geometry primitives that were identified in the client visibility phase by matching each of the identified geometry primitive with corresponding portion of the atlas comprising the geometry primitive's texture data. The display phase involves providing images of the rendered geometry primitives.

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In an embodiment, the cloud is tasked with estimating a portion of a virtual object that would be visible to a user from the camera viewpoint. In some embodiments, to account for portions of the object that becomes visible as the camera moves, additional viewpoints are derived from the camera viewpoint. In other words, portions of the object that are potentially visible from the camera viewpoint are also estimated. The cloud, or otherwise referred herein as a server, then performs expensive shading operations for those portions to generate a high-quality texture atlas. The texture atlas contains all the shading information of the visible surfaces corresponding to the rendered scenes. Then, identification of the potentially visible geometry (e.g., primitives, such as triangles), the texture atlas, and a mapping between the triangles and the texture atlas are provided to a client device. The client device uses the received information to render images based on the user's latest viewpoint by simply matching the visible triangles to the pre-rendered texture on the atlas. The client device could use the same atlas to render several frames. What this means is that the cloud doesn't need to render and transmit frames at display rate (e.g., 60 fps), but could instead take its time and send atlases at a much slower rate (e.g., 20 fps).

FIG. 1 illustrates a server generating and providing a texture atlas and identification of potentially visible primitives to a client device, and the client device using the texture atlas to render images of virtual objects. The server-side operations are performed in three phases: potential visibility phase 110, memory allocation phase 130, and shading phase 150. The potential visibility phase 110 involves the server receiving the current camera pose (e.g., current view matrix) from the client device and using the camera pose to determine the geometry primitives of virtual objects (e.g., triangles) that are visible during a time period associated with the camera pose. The memory allocation phase 130 involves determining a layout of a texture atlas comprising all of the visible geometry primitives. The shading phase 150 involves rendering the texture of all of the visible geometry primitives on the atlas. The shaded texture atlas is compressed and provided to the client device. The identifications (IDs) of potentially visible primitives are also provided to the client device. The client-side operations are also performed in three phases: client visibility phase 170, render phase 190, and display phase 195. The client visibility phase 170 involves determining the current camera pose (e.g., viewpoint), then identifying the geometry primitives that are visible from the current camera pose. The render phase 190 involves rendering the texture of the geometry primitives that were identified in the client visibility phase 170 by matching each of the identified geometry primitive with corresponding portion of the atlas that comprises the geometry primitive's texture data. The display phase 195 involves providing images of the rendered geometry primitives. The server-side operations and the client-side operations are described with additional details below.

The server executes the potential visibility phase 110 to identify portions of the geometry of virtual objects that will potentially be rendered on the client device. The unit of measurement used to identify such portions of the geometry is a geometric primitive, for example, a triangle. During the potential visibility phase 110, the server identifies triangles of virtual objects that will potentially be required by the client device so those triangles can be selectively shaded and provided to the user. While the disclosure herein may describe certain embodiments with reference to triangles, the disclosure is not limited to triangles and, instead, is equally applicable to any other geometric primitives.

In an embodiment, the server receives a user's latest head pose (e.g., HMD) and identifies triangles of virtual objects that are visible from the head pose (e.g., camera viewpoint). In an embodiment, the triangles are identified by utilizing a GPU's built-in process of determining visibility (e.g., z-buffer objects; pixel shader) to determine which triangles are visible. In some embodiment, the server receives additional pose tracking information from the client device and uses it to predict a number of possible future head poses, for example, based on the motion tracking features of an HMD. The possible head poses are used to identify triangles that may not be visible from the user's current viewpoint but are visible slightly outside the viewpoint (e.g., from the additional viewpoints corresponding to the predicted head poses). The triangles that are visible from the camera's viewpoint and the additional viewpoints derived from the camera's viewpoint are collectively referred as the "potentially visible set," or "PVS." A potentially visible set of triangles can also be described as a union of all the triangles that can be seen during a particular time period. In an embodiment, each of the triangles of virtual objects within a virtual environment are assigned with a unique ID that can be used to identify the triangles throughout the processes described herein.

In an embodiment, once the potentially visible set of triangles associated with a particular time period are identified, the server determines the triangle IDs and stores them in a first framebuffer. The server then compares the triangle IDs from the first framebuffer with triangle IDs contained in a second framebuffer that corresponds to a previous time period. This comparison allows the server to determine which triangles are newly visible and no longer visible during the current time period relative to the previous time period. The server then generates an "add list" that identifies all of the triangles that should be added to the atlas (e.g., newly visible triangles) and a "remove list" that identifies all of the triangles that should be removed from the atlas (e.g., triangles that are no longer visible). In some embodiments, a triangle may only be added to the remove list if the triangle has not been seen for several time periods.

The server executes the memory allocation phase 130 to determine the layout of a texture atlas, e.g., the placement of the triangle on the atlas, the amount of memory allocated for the triangle, whether a triangle's color information should be added or removed from the atlas, etc. For example, FIG. 2A illustrates an example atlas comprising triangles and their rendered texture (e.g., RGB data).

Figure 2A:
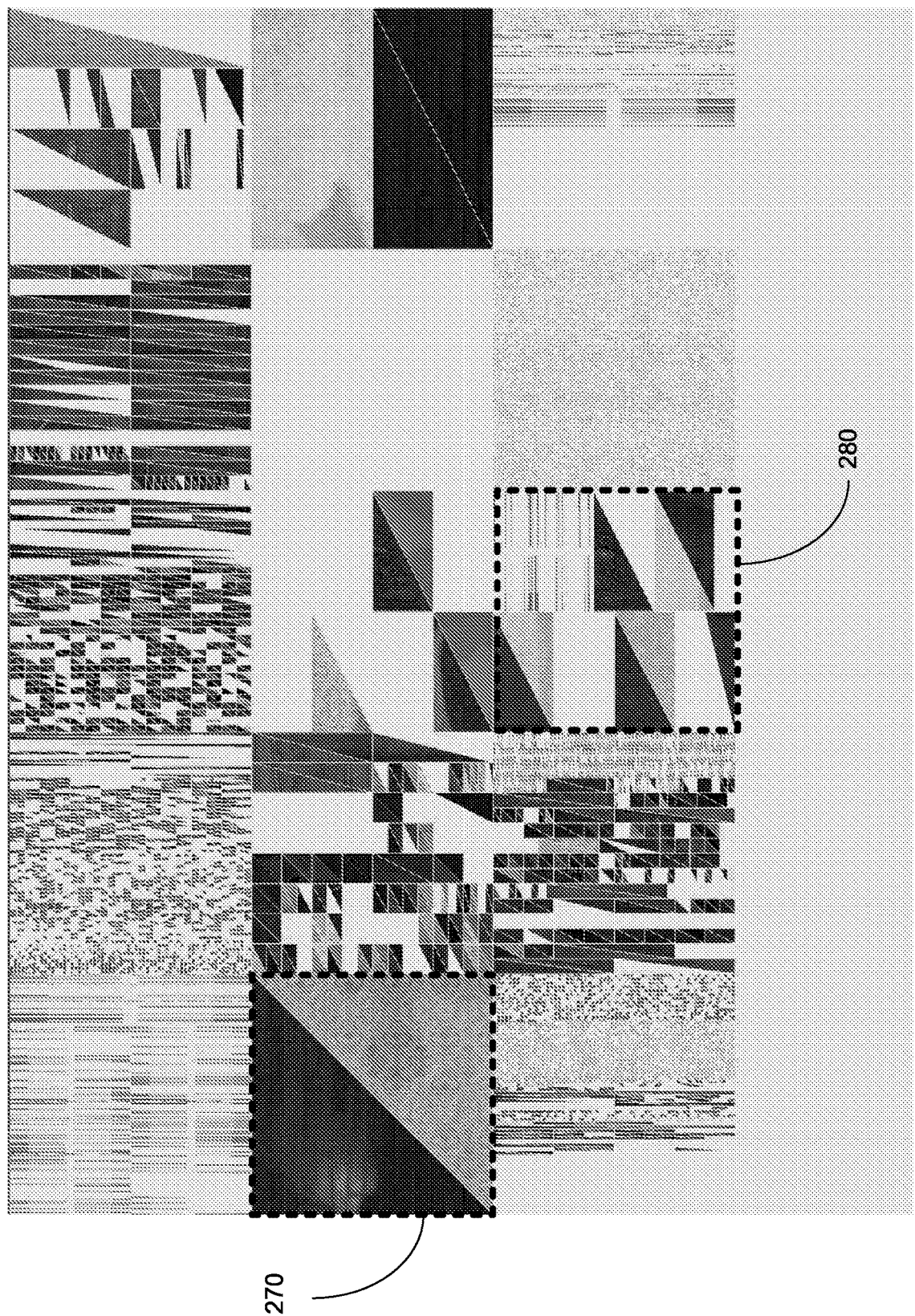
FIGS. 2A-2B. illustrates an example of a texture atlas.

As illustrated in FIG. 2A, a texture atlas, in its entirety, is essentially a 2D image comprising RGB data of triangles that are potentially visible during a particular period of time. Thus, a series of texture atlases (e.g., 2D images) can be compiled together to form a video stream. The video stream can then be compressed using standard video compression based on motion compensation/estimation techniques. At high-level, motion compensation techniques encode data based the motion of objects or based on the differences of what's visible between the video frames. Thus, minimizing the differences between the content shown between the video frames increases the compression rate and minimizes the data that needs to be communicated. So, from an compression standpoint, it is advantageous to have the triangles on the atlas kept in the same place on the atlases (e.g., a triangle is placed on the upper right corner of the atlas are kept in the same place as long as the triangle is visible and does not change its size by much). In an embodiment, when generating a new atlas corresponding to the current time period, the system updates the previously-generated atlas corresponding to the previous time period without moving the triangles around, unless needed. For example, using the lists generated from the visibility phase (e.g., the add list and the remove list, which may be provided in a single, combined list), the system removes the triangles on the remove list from the atlas, thereby freeing the memory allocated for them, and places the newly visible triangles on the add list onto the atlas.

In an embodiment, the size of each of the triangles with respect to the triangle's placement on the atlas is determined based on the distance between the location of the triangle in the virtual space and the camera viewpoint. Triangles are allocated varying portions of the atlas based on the proportion of the field of view the triangle occupies. For example, if a triangle is located close to the camera viewpoint, a large portion of the field of view will be occupied by the triangle. In such cases, the triangle is allocated a larger portion of the atlas because the amount of space the triangle occupies on the atlas dictates the amount of texture data (or resolution) available for the triangle. Similarly, triangles that are further away from the camera viewpoint and thus occupying smaller portion of the view of view are provided smaller portions. In an embodiment, the size of a triangle in screen space is determined by projecting the triangle onto the camera viewpoint.

Figure 2B:
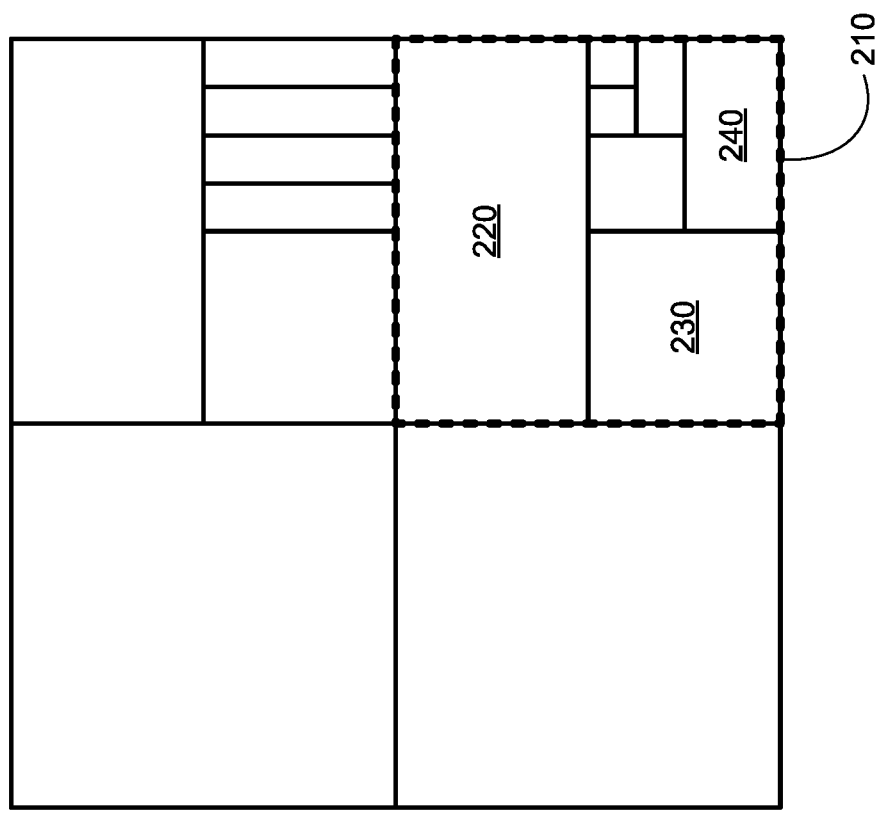

In an embodiment, the atlas is divided into a hierarchy of regions (e.g., blocks). For example, FIG. 2A illustrates an atlas with block region 270 that is filled with two large triangles and block region 280 with is partially filled with a number of smaller triangles. In an embodiment, when new triangles are added into the atlas, the triangles may be prioritized into partially filled regions before being allocated to a new region. In an embodiment, each triangle is made to be a right triangle with two perpendicular edges that are connected to measures 90° and another diagonal edge that connects the two perpendicular edge to form the triangle. FIG. 2B further illustrates how each block region of an atlas may be divided. Block 201 represents a block region of an atlas, such as the block regions 240 and 230 illustrated in FIG. 2A. Block region 201 may be divided into smaller sub-blocks until the smallest triangle is able to fit within the smallest sub-block. For example, block region 201 may be divided into a sub-block 210, then divided again into a sub-block 220, then again into sub-block 230, then again into sub-block 240, and so on until the smallest visible triangle can fit into the smallest sub-block.

In an embodiment, if the size of any one triangle increases, or decreases, by a substantial amount, the system may determine that the triangle should be relocated to a different location on the atlas. Such triangles are removed from the atlas, then placed at a location that is appropriate for their new size. For example, if a triangle that was far from a camera viewpoint is now much closer to the viewpoint, the triangle may be relocated and allocated a larger portion of the atlas. Similarly, triangles that move away from the viewpoint by a particular distance may be relocated and provided a smaller portion of the atlas.

Figure 3A:
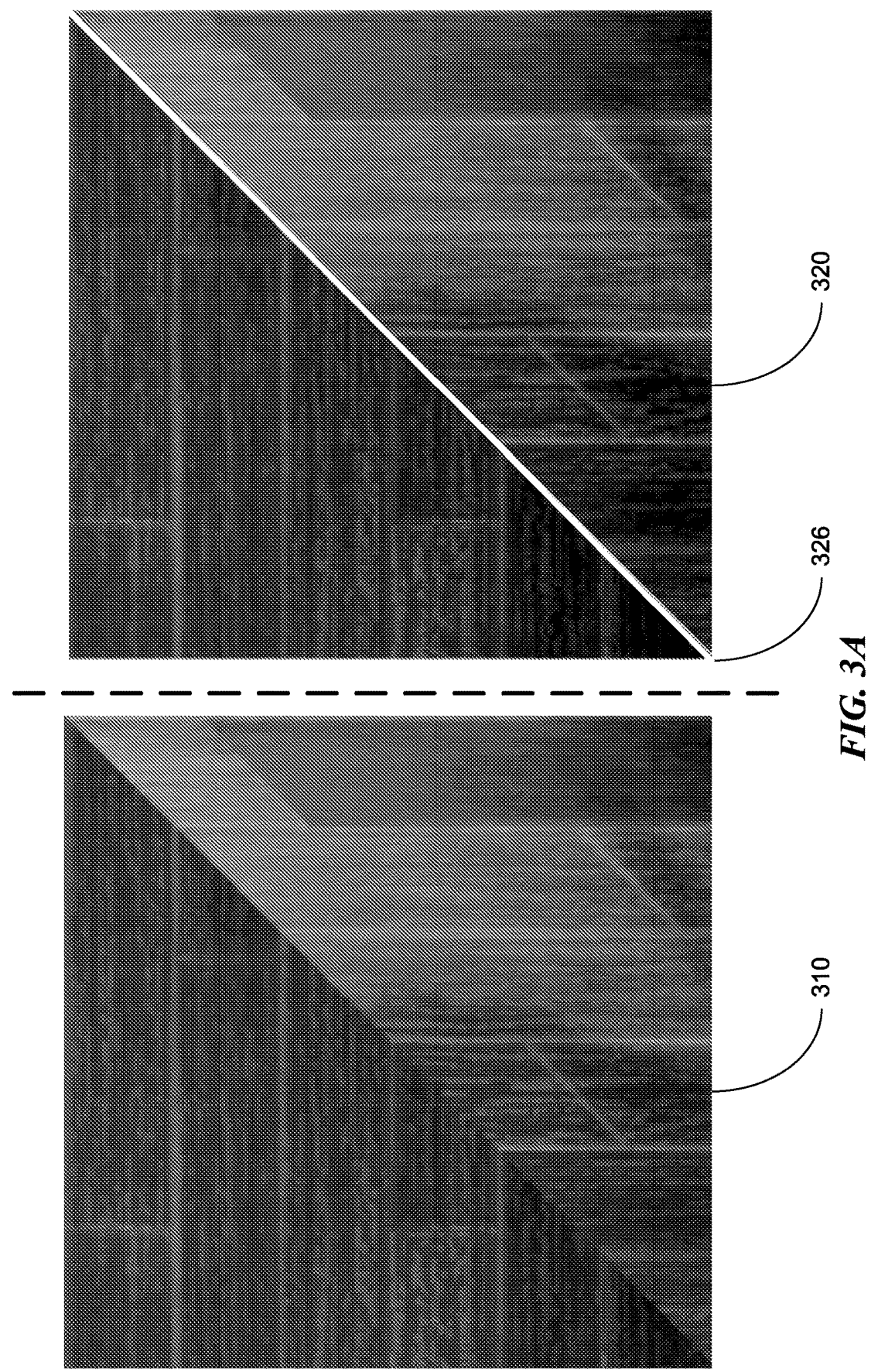
FIGS. 3A-3B illustrate another example of a texture atlas.
Figure 3B:
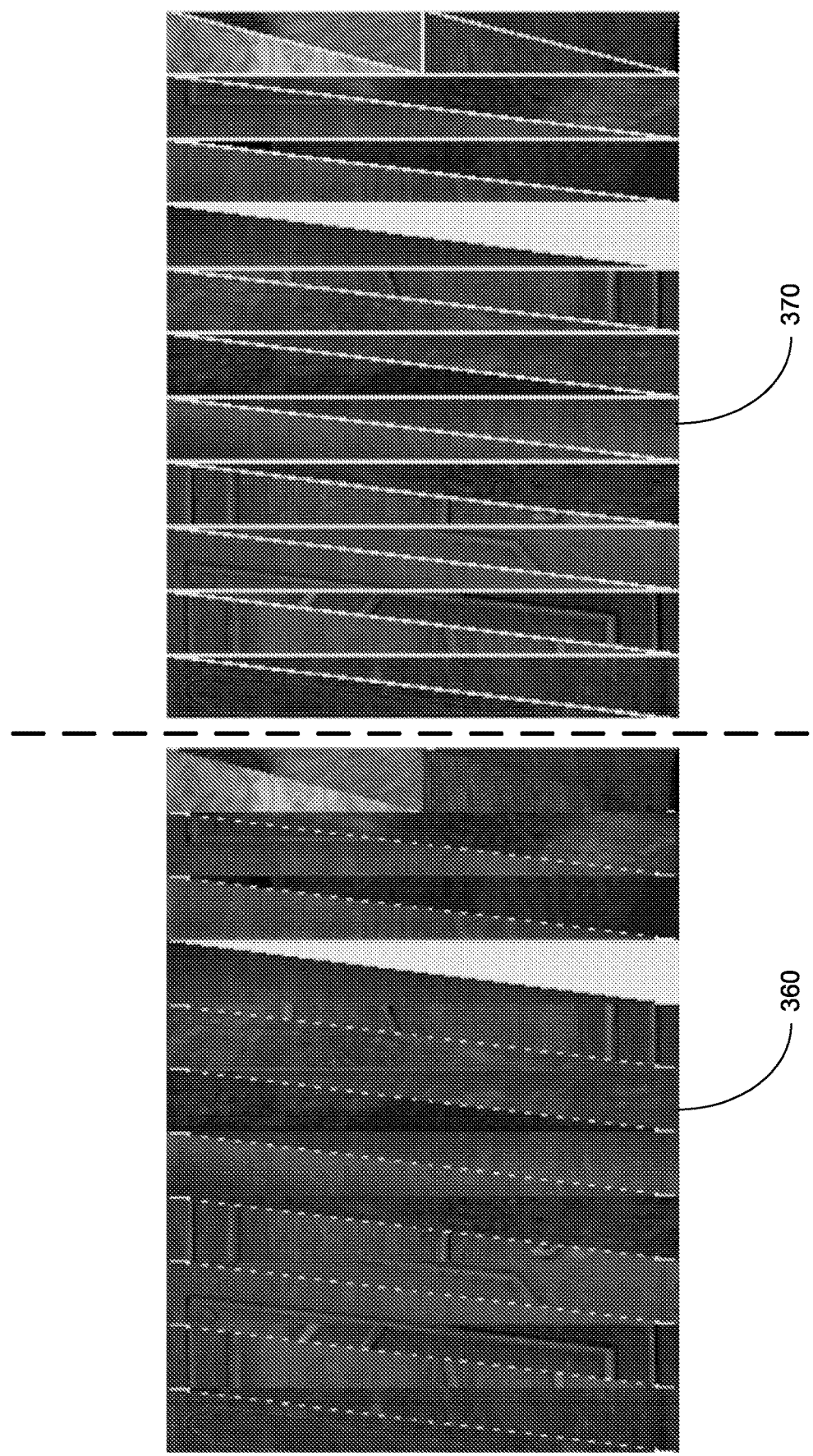

In an embodiment, triangles that are placed within an atlas are reduced in size (e.g., scaled down) to create a layer of buffer between each of the adjacent triangles in the atlas. Creating the layer of buffer between adjacent triangles remedies artifacts that may be created during downstream processes, e.g., from a conservative rasterization technique. Given that the triangles are packed into the atlas without regard to their actual location in the virtual space, e.g., the geometrical representation of virtual objects, any two adjacent triangles on the atlas could have vastly different texture. Thus, when the texture data of the atlas are filtered by downstream sampling processes, texture data from one triangle could bleed onto adjacent triangles because filters are often applied in a shape of a box (e.g., square or rectangle). For example, FIG. 3A illustrates two triangles packed into a block region 310. When downstream sampling processes filter the block region 310, the entire block region 310 may be sampled without regard to the fact that the two triangles within the block region 310 may have different textures. This could cause bleeding artifacts. To address the boundary filtering issue, in an embodiment, triangles that are placed within an atlas are scaled down to create a layer of buffer between each of the adjacent triangles in the atlas. For example, block 320 in FIG. 3A illustrates two triangles that have been slightly scaled down to create a buffer 326 between the two triangles. In an embodiment, the buffer may be created for all sides of the triangle. For example, FIG. 3B illustrates a sub-block 360 with triangles that have not been scaled down and a sub-block 370 with the same triangles that have scaled down to create a layer of buffer around the triangles. In an embodiment, a buffer may be created with a width corresponding to the aspect ratio or size of triangles. For example, if a triangle's aspect ratio is high (e.g., large difference between the triangle's width and length), the width of the buffer may be increased. If the triangle's aspect ratio is low (e.g., small difference between the triangle's width and length), the width of the buffer may be decreased.

The server executes the shading phase 150 to render the texture of each of the triangles on the atlas. The shading phase involves determining the texture (e.g., RGBA) of each of the triangles on the atlas based on lighting and material properties in the virtual environment. This is an expensive operation that the client device might not be able to properly handle to achieve the desired quality and framerate. In embodiment, all of the triangles in the potentially visible set are shaded from the camera's viewpoint.

In an embodiment, the server provides three sets of data to the client device. The first data set relates to the mesh geometry of virtual objects, which may be sent to the client device at some timepoint before providing the other sets of data. In some embodiments, the mesh geometry is a simplified representation of the geometry that corresponds to the triangles in the potentially visible set (e.g., mesh geometry may represent only a portion of the geometry that are potentially visible). The second data set relates to the shaded atlases that are compressed and transmitted to the client device. The third data set relates to a list indicating the triangle IDs of the potentially visible set along with mapping information that maps each of the potentially visible triangles with the corresponding texture on the atlas. In an embodiment, the list of triangle IDs may only comprise triangle IDs of triangles included in the add list and the remove list (e.g., newly visible and no longer visible triangles with the previous time period). In such an embodiment, the client device may determine the triangle IDs that are in the potentially visible set by comparing the received list of triangle IDs to the triangle IDs in the previous potentially visible set (e.g., the previous time period). In other embodiments, the list may comprise all of the triangle IDs that are in the potentially visible set.

In an embodiment, the mapping information specifying a mapping between each of the potentially visible and the corresponding texture data on the atlas may be encoded based on the hierarchical organization of the atlas. The mapping information associated with each triangle may be encoded by utilizing a few bits to identify the largest sub-block that the triangle falls into and additional bits could be used to identify the smaller sub-blocks that the triangle also falls into. For example, if encoding the mapping information of a triangle falling into sub-block 220 illustrated in FIG. 2B, first four bits could identify block 201, next two bits could identify sub-block 210, and the next two bits could identify sub-block 220. In an embodiment, for each triangle ID included in the potentially visible set provided to the client device, the system may also provide the corresponding mapping information to allow the client device to identify the texture data of the corresponding triangle in the texture atlas.

The client device executes the client visibility phase 170 to determine the triangles (e.g., of the server-provided mesh geometry) that should be rendered from the current camera pose (e.g., viewpoint). In some embodiments, the client device may use depth-buffer testing (e.g., rasterization process provided by a GPU) to identify the triangles that should be rendered from the camera viewpoint. The depth-buffer testing allows the client device to identity, among overlapping triangles, triangles that are closer to the camera viewpoint and thus should be rendered.

The client device executes the render phase 190 to render the texture of the triangles that were identified based on the current camera viewpoint. The render phase 190 involves matching each of the identified triangles with the corresponding portion of the atlas comprising the triangle's texture data, for example, based on the mapping information provided by the server.

In some embodiment, the server provides the mesh geometry to the client device at a much slower frequency (e.g., 15 Hz or 15 times per second) than the texture information (e.g., 60 Hz, 72 Hz, etc.). In such embodiments, the client device may execute animation extrapolation, interpolation, or spline mathematical technique to smooth out the series of mesh geometry displayed on the client device (e.g., mesh animation). This technique allows the mesh geometry to be displayed at native refresh rates, such as 72 Hz, even though the mesh geometry is provided to the user at a much slower rate.

The client device executes the display phase 195 to provide images of a scene comprising the rendered triangles of the virtual objects in the scene. In an embodiment, the client device renders a scene by compiling/arranging the rendered triangles according to the corresponding mesh geometry.

Figure 4:
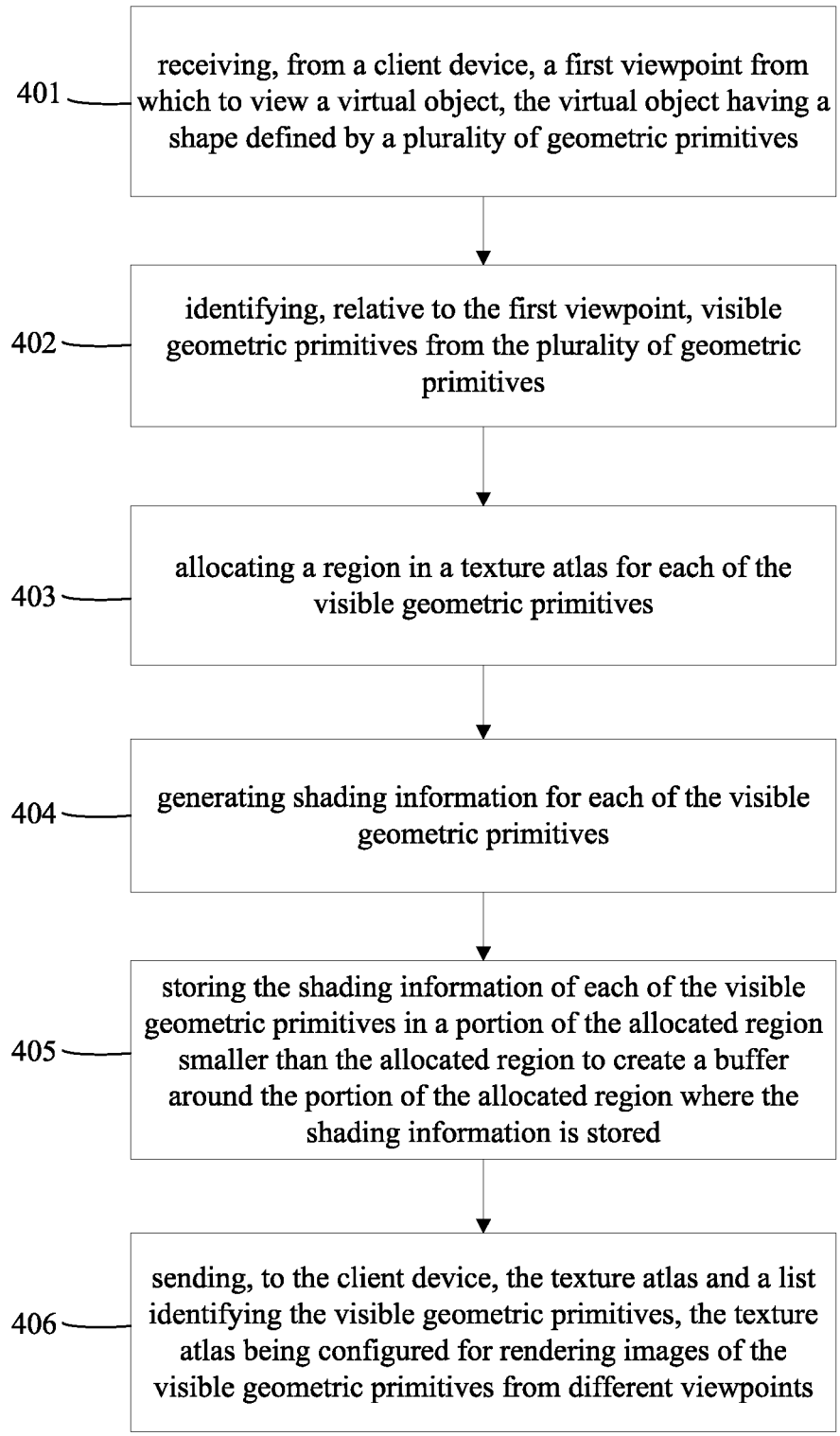
FIG. 4 illustrates an example method for generating a texture atlas.

FIG. 4 illustrates an example method 400 for rendering generating a texture atlas configured for rendering images of visible geometric primitives from different viewpoints. The method may begin at step 401 by receiving, from a client device, a first viewpoint from which to view a virtual object, the virtual object having a shape defined by a plurality of geometric primitives. At step 402, the method may continue by identifying, relative to the first viewpoint, visible geometric primitives from the plurality of geometric primitives. At step 403, the method may continue by allocating a region in a texture atlas for each of the visible geometric primitives. At step 404, the method may continue by generating shading information for each of the visible geometric primitives. At step 405, the method may continue by storing the shading information of each of the visible geometric primitives in a portion of the allocated region smaller than the allocated region to create a buffer around the portion of the allocated region where the shading information is stored. At step 406, the method may continue by sending, to the client device, the texture atlas and a list identifying the visible geometric primitives, the texture atlas being configured for rendering images of the visible geometric primitives from different viewpoints. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for rendering generating a texture atlas configured for rendering images of visible geometric primitives from different viewpoints, this disclosure contemplates any suitable method for rendering generating the texture atlas including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
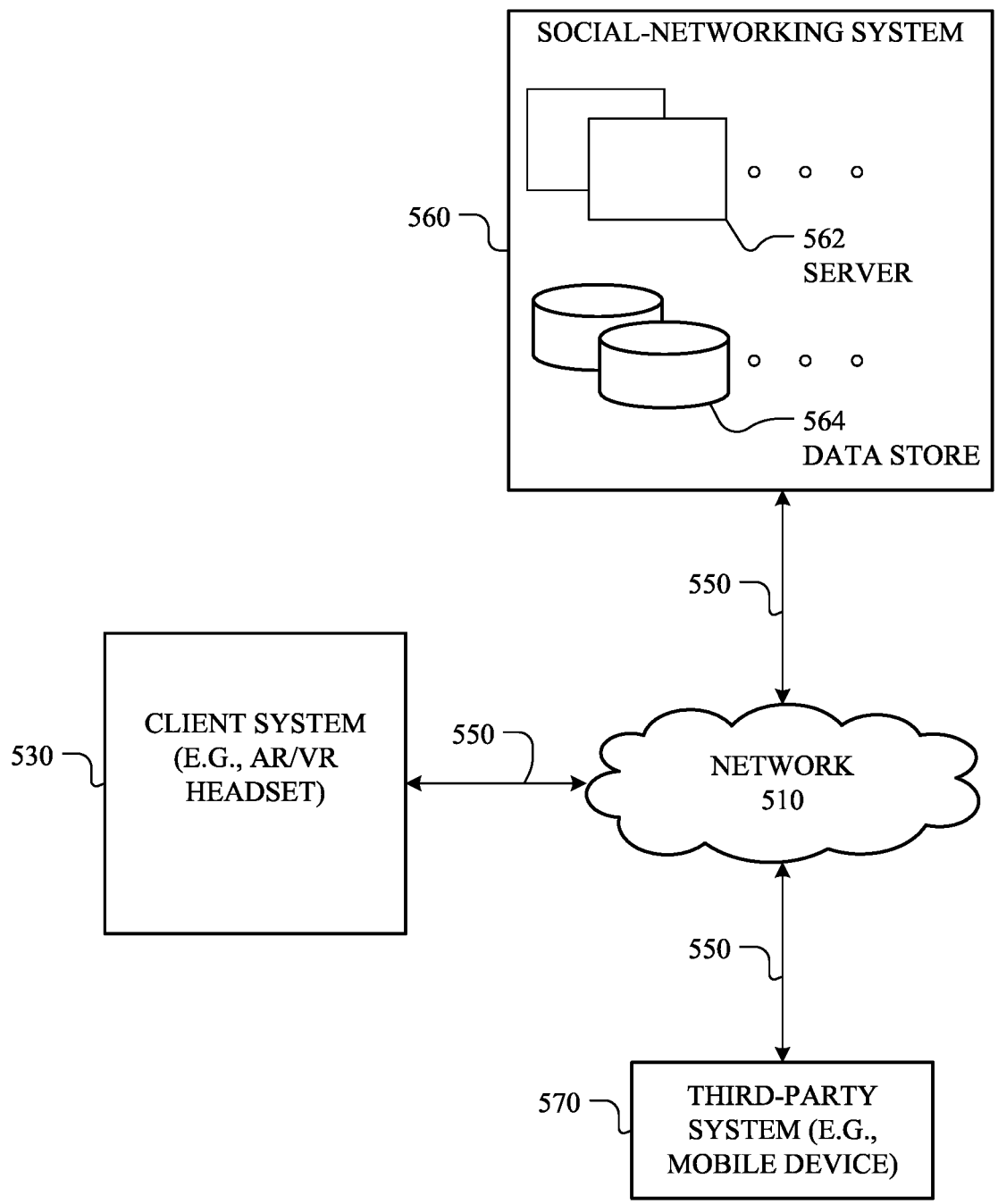
FIG. 5 illustrates an example network environment.

FIG. 5 illustrates an example network environment 500 associated with a social-networking system. Network environment 500 includes a client system 530, a social-networking system 560, and a third-party system 570 connected to each other by a network 510. Although FIG. 5 illustrates a particular arrangement of client system 530, social-networking system 560, third-party system 570, and network 510, this disclosure contemplates any suitable arrangement of client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. For example, an AR/YR headset 530 may be connected to a local computer or mobile computing device 570 via short-range wireless communication (e.g., Bluetooth). Moreover, although FIG. 5 illustrates a particular number of client systems 530, social-networking systems 560, third-party systems 570, and networks 510, this disclosure contemplates any suitable number of client systems 530, social-networking systems 560, third-party systems 570, and networks 510. As an example and not by way of limitation, network environment 500 may include multiple client system 530, social-networking systems 560, third-party systems 570, and networks 510.

This disclosure contemplates any suitable network 510. As an example and not by way of limitation, one or more portions of network 510 may include a short-range wireless network (e.g., Bluetooth, Zigbee, etc.), an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi, Worldwide Interoperability for Microwave Access (WiMAX), Bluetooth), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

In particular embodiments, client system 530 may be an electronic device including hardware, software, or embedded logic components or a combination of two or more such components and capable of carrying out the appropriate functionalities implemented or supported by client system 530. As an example and not by way of limitation, a client system 530 may include a computer system such as a VR/AR headset, desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 530. A client system 530 may enable a network user at client system 530 to access network 510. A client system 530 may enable its user to communicate with other users at other client systems 530.

In particular embodiments, social-networking system 560 may be a network-addressable computing system that can host an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. As an example and not by way of limitation, client system 530 may access social-networking system 560 using a web browser, or a native application associated with social-networking system 560 (e.g., a mobile social-networking application, a messaging application, another suitable application, or any combination thereof) either directly or via network 510. In particular embodiments, social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, social-networking system 560 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplates any suitable types of databases. Particular embodiments may provide interfaces that enable a client system 530, a social-networking system 560, or a third-party system 570 to manage, retrieve, modify, add, or delete, the information stored in data store 564.

In particular embodiments, social-networking system 560 may store one or more social graphs in one or more data stores 564. In particular embodiments, a social graph may include multiple nodes—which may include multiple user nodes (each corresponding to a particular user) or multiple concept nodes (each corresponding to a particular concept)—and multiple edges connecting the nodes. Social-networking system 560 may provide users of the online social network the ability to communicate and interact with other users. In particular embodiments, users may join the online social network via social-networking system 560 and then add connections (e.g., relationships) to a number of other users of social-networking system 560 to whom they want to be connected. Herein, the term "friend" may refer to any other user of social-networking system 560 with whom a user has formed a connection, association, or relationship via social-networking system 560.

In particular embodiments, social-networking system 560 may provide users with the ability to take actions on various types of items or objects, supported by social-networking system 560. As an example and not by way of limitation, the items and objects may include groups or social networks to which users of social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 560 or by an external system of third-party system 570, which is separate from social-networking system 560 and coupled to social-networking system 560 via a network 510.

In particular embodiments, social-networking system 560 may be capable of linking a variety of entities. As an example and not by way of limitation, social-networking system 560 may enable users to interact with each other as well as receive content from third-party systems 570 or other entities, or to allow users to interact with these entities through an application programming interfaces (API) or other communication channels.

In particular embodiments, a third-party system 570 may include a local computing device that is communicatively coupled to the client system 530. For example, if the client system 530 is an AR/VR headset, the third-party system 570 may be a local laptop configured to perform the necessary graphics rendering and provide the rendered results to the AR/VR headset 530 for subsequent processing and/or display. In particular embodiments, the third-party system 570 may execute software associated with the client system 530 (e.g., a rendering engine). The third-party system 570 may generate sample datasets with sparse pixel information of video frames and send the sparse data to the client system 530. The client system 530 may then generate frames reconstructed from the sample datasets.

In particular embodiments, the third-party system 570 may also include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating social-networking system 560. In particular embodiments, however, social-networking system 560 and third-party systems 570 may operate in conjunction with each other to provide social-networking services to users of social-networking system 560 or third-party systems 570. In this sense, social-networking system 560 may provide a platform, or backbone, which other systems, such as third-party systems 570, may use to provide social-networking services and functionality to users across the Internet.

In particular embodiments, a third-party system 570 may include a third-party content object provider (e.g., including sparse sample datasets described herein). A third-party content object provider may include one or more sources of content objects, which may be communicated to a client system 530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 560 also includes user-generated content objects, which may enhance a user's interactions with social-networking system 560. User-generated content may include anything a user can add, upload, send, or "post" to social-networking system 560. As an example and not by way of limitation, a user communicates posts to social-networking system 560 from a client system 530. Posts may include data such as status updates or other textual data, location information, photos, videos, links, music or other similar data or media. Content may also be added to social-networking system 560 by a third-party through a "communication channel," such as a newsfeed or stream.

In particular embodiments, social-networking system 560 may include a variety of servers, sub-systems, programs, modules, logs, and data stores. In particular embodiments, social-networking system 560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 560 may also include suitable components such as network interfaces, security mechanisms, load balancers, failover servers, management-and-network-operations consoles, other suitable components, or any suitable combination thereof. In particular embodiments, social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 560 to one or more client systems 530 or one or more third-party system 570 via network 510. The web server may include a mail server or other messaging functionality for receiving and routing messages between social-networking system 560 and one or more client systems 530. An API-request server may allow a third-party system 570 to access information from social-networking system 560 by calling one or more APIs. An action logger may be used to receive communications from a web server about a user's actions on or off social-networking system 560. In conjunction with the action log, a third-party-content-object log may be maintained of user exposures to third-party-content objects. A notification controller may provide information regarding content objects to a client system 530. Information may be pushed to a client system 530 as notifications, or information may be pulled from client system 530 responsive to a request received from client system 530. Authorization servers may be used to enforce one or more privacy settings of the users of social-networking system 560. A privacy setting of a user determines how particular information associated with a user can be shared. The authorization server may allow users to opt in to or opt out of having their actions logged by social-networking system 560 or shared with other systems (e.g., third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

Figure 6:
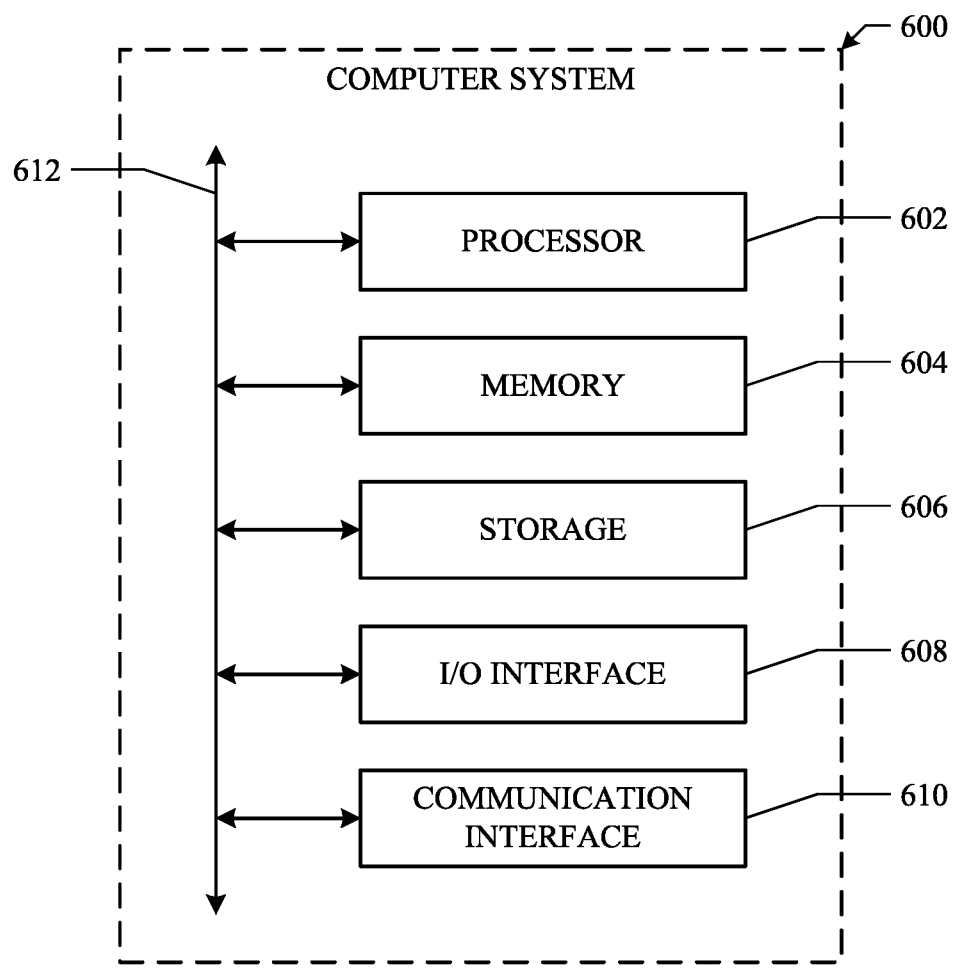
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   receiving a geometric representation of a virtual object, the geometric representation comprising a plurality of geometric primitives;
   receiving a texture atlas comprising a plurality of regions, each region allocated to include shading information of a respective geometric primitive of the plurality of geometric primitives; and
   receiving information indicating a mapping between each of the plurality of regions of the texture atlas and each respective geometric primitive of the plurality of geometric primitives, wherein the information indicating the mapping is encoded based on a hierarchical organization of the texture atlas;
   identifying, based on a first viewpoint from which to view the virtual object, a visible image portion associated with a respective geometric primitive from the plurality of geometric primitives; and
   rendering the visible image portion associated with the respective geometric primitive using corresponding shading information included in the texture atlas.

2. The method of claim 1, wherein the plurality of geometric primitives are right triangles.

3. The method of claim 1, wherein the texture atlas is compressed using motion estimation techniques.

4. The method of claim 1, further comprising:
   sending, to a computer server, a second viewpoint from which to view the virtual object;
   wherein the plurality of geometric primitives received as part of the geometric representation are identified by the computer server based on the second viewpoint.

5. One or more computer-readable non-transitory storage media embodying software that is operable when executed to:
   receive a geometric representation of a virtual object, the geometric representation comprising a plurality of geometric primitives;
   receive a texture atlas comprising a plurality of regions, each region allocated to include shading information of a respective geometric primitive of the plurality of geometric primitives; and
   receiving information indicating a mapping between each of the plurality of regions of the texture atlas and each respective geometric primitive of the plurality of geometric primitives, wherein the information indicating the mapping is encoded based on a hierarchical organization of the texture atlas;
   identify, based on a first viewpoint from which to view the virtual object, a visible image portion associated with a respective geometric primitive from the plurality of geometric primitives; and
   render the visible image portion associated with the respective geometric primitive using corresponding shading information included in the texture atlas.

6. The one or more computer-readable non-transitory storage media of claim 5, wherein the plurality of geometric primitives are right triangles.

7. The one or more computer-readable non-transitory storage media of claim 5, wherein the texture atlas is compressed using motion estimation techniques.

8. The one or more computer-readable non-transitory storage media of claim 5, wherein the software is further operable when executed to:
   send, to a computer server, a second viewpoint from which to view the virtual object;
   wherein the plurality of geometric primitives received as part of the geometric representation are identified by the computer server based on the second viewpoint.

9. A system comprising: one or more processors; and one or more computer-readable non-transitory storage media in communication with the one or more processors, the one or more computer-readable non-transitory storage media comprising instructions that when executed by the one or more processors, cause the system to:
   receive a geometric representation of a virtual object, the geometric representation comprising a plurality of geometric primitives;
   receive a texture atlas comprising a plurality of regions, each region allocated to include shading information of a respective geometric primitive of the plurality of geometric primitives; and
   receiving information indicating a mapping between each of the plurality of regions of the texture atlas and each respective geometric primitive of the plurality of geometric primitives, wherein the information indicating the mapping is encoded based on a hierarchical organization of the texture atlas;
   identify, based on a first viewpoint from which to view the virtual object, a visible image portion associated with a respective geometric primitive from the plurality of geometric primitives; and
   render the visible image portion associated with the respective geometric primitive using corresponding shading information included in the texture atlas.

10. The system of claim 9, wherein the plurality of geometric primitives are right triangles.

11. The system of claim 9, wherein the texture atlas is compressed using motion estimation techniques.

* * * * *